United States Patent
King (10) Patent No.: US 8,166,551 B2
(45) Date of Patent: Apr. 24, 2012

(54) AUTOMATED SECURITY MANAGER

(75) Inventor: Nigel King, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 950 days.

(21) Appl. No.: 11/879,429

(22) Filed: Jul. 17, 2007

(65) Prior Publication Data

US 2009/0024627 A1    Jan. 22, 2009

(51) Int. Cl.
*G06F 21/00*    (2006.01)

(52) U.S. Cl. .......................................... 726/25

(58) Field of Classification Search ...................... 726/25
See application file for complete search history.

(56) References Cited

U.S. PATENT DOCUMENTS

| | | | |
|---|---|---|---|
| 6,374,358 B1 * | 4/2002 | Townsend | 726/1 |
| 7,360,123 B1 * | 4/2008 | Westenberg et al. | 714/47.2 |
| 2004/0064726 A1 * | 4/2004 | Girouard | 713/201 |
| 2005/0278786 A1 * | 12/2005 | Tippett et al. | 726/25 |
| 2006/0021050 A1 * | 1/2006 | Cook et al. | 726/25 |

* cited by examiner

*Primary Examiner* — Benjamin Lanier
*Assistant Examiner* — Cordelia Zecher
(74) *Attorney, Agent, or Firm* — Kraguljac Law Group LLC (57) ABSTRACT

Systems, methods, media, and other embodiments associated with automated security management are described. One example system embodiment includes logic to collect, organize, and maintain data concerning electronic information resources, data concerning security criteria to which the electronic information resources may be subjected, and data concerning security risks to which the electronic information resources may be susceptible. The system may include logic to make an automated security management decision based on analyzing the data concerning the electronic information resources, the data concerning the security criteria, and the data concerning the security risks.

22 Claims, 7 Drawing Sheets

AUTOMATED SECURITY MANAGER

BACKGROUND

Conventionally, information security management may have been considered to be a technology problem and may have been handled, if at all, by a systems administrator. However, information security may be viewed as more of a business and regulatory issue than a technology issue. As information security continues to increase in importance, organizations are challenged and/or required to prove that they are managing information security to a level that will satisfy customers, management, government and corporate regulators, auditors, and so on. This is especially true in areas including finance (e.g., Gramm-Leach-Blilely (GLB)), communications, travel (e.g., Patriot Act), health care (e.g., Health Insurance Portability Accountability Act (HIPAA)), and other fields.

Standards bodies and government agencies continue to provide guidelines and regulations concerning information security. For example, ISO (International Standards Organization) 17799 defines, at a high level, an information security program and architecture. Federal Circular A-123 provides guidance to managers of federal agencies on establishing accountability and internal controls. This guidance includes standards and requirements for conducting assessments of internal controls related to financial reporting. The Federal Information Security Management Act (FISMA) defines an architecture for reporting information security incidents within the federal government. This act requires departments and agencies to implement security architectures and policies to address vulnerabilities to their enterprise systems. Sarbanes-Oxley (SOX) describes standards and requirements for conducting assessments over financial reporting for publicly held companies.

Government is not the only body to promulgate standards and provide guidelines. Consider the VISA Cardholder Information Security Program (CISP). CISP is designed to protect cardholder data, regardless of where it resides, and to ensure that members, merchants, service providers, and so on, maintain acceptable standards of information security, both to increase consumer confidence and to reduce risk of loss and actual loss. Companies like VISA may wish to audit their members to determine the degree to which the CISP is implemented. Conventionally this audit may have been a manual, in-person review that requires the compilation of data from numerous locations.

Standards and guidelines provide benchmarks against which designed systems and/or deployed systems can be compared. Typically this comparing has been done manually, on an ad hoc basis, usually co-opting auditors and information technology personnel (e.g., system administrators). With the presence of diverse human actors, standards may be inconsistently interpreted and/or applied, and therefore the validity and value of the results may be questioned. Comparisons between standards and implemented systems have typically included examining factors including whether physical best practices and/or technological best practices are defined, in place, used, and appropriate.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Example systems and methods concern automated information security management. Example systems and methods include computing systems and computerized business intelligence applications that may be used, for example, by a security manager. Example systems and methods facilitate constructing, testing, evaluating, and/or scoring security management related items. The security management items may include disaster recovery plans, threat response plans, business continuity plans, and so on. These items may depend on information gathered about resources and on information derived from the gathered information.

The gathered information may include, for example, identifying information (e.g., ownership information, custodial information, security classification information). The gathered information may also include risk and response information (e.g., related countermeasure information (e.g., controls, processes, personnel, protocols), related business continuity plans, maximum allowable down time data, risk, likelihood of risk occurrence, risk impact, risk analysis attributes (e.g., asset value (AV), exposure factor (EF)). The gathered information may also include relationship information (e.g., minimal computing resources required for an information asset, business processes supported by the resource, critical resources that can be made inoperable by the occurrence of a risk event related to the resource, alternate available resources (e.g., failover server, failover site)).

The derived information may include, loss information (e.g., loss likelihood, loss impact analysis, insurability information, set aside information, cost of a single outage, annual rate of occurrence (ARO)). The gathered and/or derived information may be used in impact analysis, planning, cost justification, loss analysis (e.g., single loss expectancy, annual loss expectancy) and so on. This information may also be used to populate fields in a scorecard when there has been an interruption. For example, a recovery time objective entry may store data about when the resource is expected to be available and a recovery point objective entry may store data about the point in time to which the resource will be returned. These may be reported on a scorecard and used to make a decision(s).

Example systems and methods may produce a scorecard that stores and/or provides gathered and/or derived information that facilitates making security management decisions. The scorecard may be displayed on a computer display. These decisions may include determining whether to insure for a risk and if so what the insurance coverage should be. The decisions may also include determining whether to accept a risk, whether to transfer a risk, whether to mitigate a risk, and so on. The decisions may also include determining whether a designed system complies with regulations and/or guidelines and thus is certifiable as designed and determining whether a deployed system complies with regulations and/or guidelines and thus is certifiable as deployed. The decisions may also include determining what additional practices, processes, and/or technology need to be considered to bring a system into compliance or to produce an acceptable risk ratio, and so on. Since the scorecard provides information about how well a security manager is protecting an organization and its resources, the scorecard may also be used to determine compensation (e.g., salary, bonus) for personnel involved in providing security management. Similarly, since the scorecard provides information about how well a security management system is protecting an organization and its resources, the scorecard may be used to determine what additional resources (e.g., budgeting) need to be brought to bear as justified by determined risk likelihood and cost.

In one example, the scorecard stores metrics that can be used to measure security management performance. These metrics concern issues including audit monitoring, access control, availability, confidentiality, integrity, and so on. In one example, the scorecard reports key performance indicators for a security management system. Example indicators include the percent of users that have received security awareness training, the percent of systems having baseline (or better) designs, the percent of systems having baseline (or better) deployments, the percent of security incidents caused by physical access control failures, and so on. In one example, data on the scorecard may be snapshot data with a freshness indicator and/or dynamic (e.g., changing) data. The scorecard facilitates examining whether best practices are being employed and if so their impact on security. The best practices may include restrictions on physical access to data, guidelines for storing a minimal data set, determining whether default configurations are in place and appropriate, determining whether data is being purged in appropriate amounts at appropriate times, and determining whether firewalls, anti-virus software, and so on, are functioning and updated.

One example system groups together several logics that facilitate basing security evaluations on best practices. The system facilitates feeding the results of a security evaluation into a broader compliance program. In this program, an overall business plan can influence security priorities, which in turn can influence information technology projects, portfolio management, business continuity planning, loss prevention and insuring, and so on. Example systems and methods facilitate basing a business continuity plan on live information resources and criticality relationships between processes, data, and apparatus that rely on these resources. Example systems and methods facilitate making security governance a prescribed process in an organization. The prescribed process may have a single identifiable output (e.g., scorecard) that can be the result of standard, automated audit processes.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Machine-readable medium", as used herein, refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Electronic information resource", as used herein, refers to an information resource pertaining to, or controlled by computers, or computer products and services.

"Logic", as used herein, includes but is not limited to hardware, firmware, executable software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing executable instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, executable computer or processor instructions that can be read, interpreted, and/or executed and that cause a computer, processor, or other electronic device to perform functions, actions and/or behave in a desired manner. The instructions may be embodied in various forms including routines, algorithms, modules, methods, threads, and/or programs. Software may also be implemented in a variety of executable and/or loadable forms including, but not limited to, a stand-alone program, a function (local and/or remote), a servelet, an applet, instructions stored in a memory, part of an operating system or other types of executable instructions. It will also be appreciated that machine-readable and/or executable instructions can be located in one logic and/or distributed between two or more communicating, co-operating, and/or parallel processing logics and thus can be loaded and/or executed in serial, parallel, massively parallel and other manners. "Software" does not refer to source code instructions, but rather to executing instructions that transform a general purpose computer into a special purpose computer.

Software, whether an entire system or a component of a system, may be embodied as an article of manufacture and maintained or provided as part of a machine-readable medium as defined previously. Another form of software may include signals that transmit executable instructions to a recipient over a network or other communication medium.

"User", as used herein, includes but is not limited to one or more persons, software, computers or other devices, or combinations of these.

Figure 1:
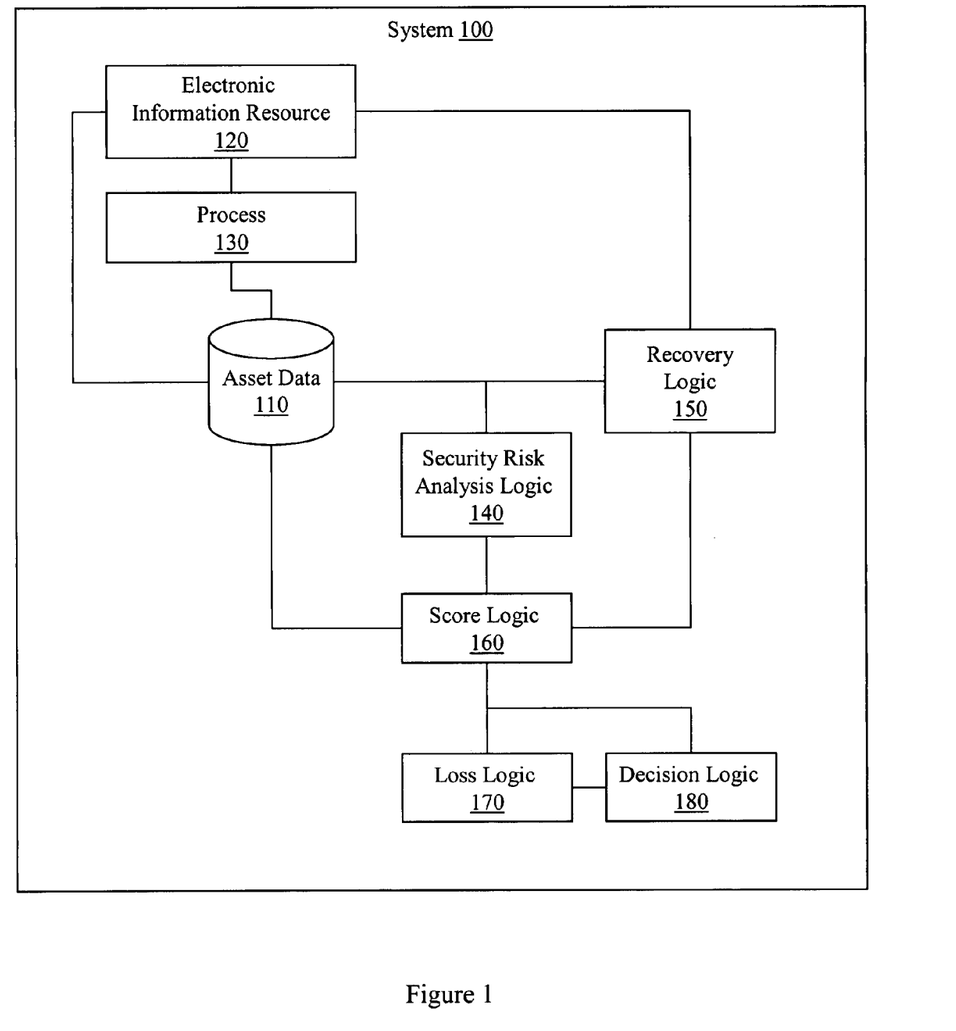
FIG. 1 illustrates a system associated with automated security management.

FIG. 1 illustrates a system 100 associated with automated security management. System 100 includes a data store 110 to store asset data. The asset data is related to (e.g., describes, characterizes, identifies) an electronic information resource 120. The asset data is also related to a process 130 that relies on the electronic information resource 120. While a single electronic information resource 120 and a single process 130 are illustrated, it is to be appreciated that data store 110 may store asset data concerning a greater number of resources and processes. In one example, the asset data describes electronic information resources associated with a database system. Thus, the information resources may include, for example, database tables. Similarly, the asset data may describe database processes that rely on the electronic information resources. The database processes may include, for example, database applications.

In one example, the asset data may include identification data that describes electronic information resource ownership, electronic information resource custody, and so on. The asset data may also include characterizing data that describes, for example, an electronic information resource security classification, a maximum allowable downtime associated with an electronic information resource, and a failover resource associated with an electronic information resource. The asset data may also include data that describes plans and/or actions to be taken upon the occurrence of a risk. For example, the asset data may include data describing a disaster recovery plan associated with an electronic information resource, a risk countermeasure available for an electronic information resource, a threat response plan associated with an electronic information resource, and a business continuity plan associated with an electronic information resource.

The asset data may also include data concerning preventing risks. For example, the asset data may include a purge schedule associated with an electronic information resource, a physical access limitation associated with an electronic information resource, and an electronic access limitation associated with an electronic information resource.

System 100 also includes a security risk analysis logic 140 to identify a risk associated with an electronic information resource 120. The risk may be, for example, a confidentiality risk (e.g., private data no longer private), an availability risk (e.g., data not available), an integrity risk (e.g., unsure whether data is accurate), an authentication risk (e.g., unable to determine whether a user is authorized to access data), a non-repudiation risk, and so on. The risk may be a potential risk or an actual risk. The security risk analysis logic 140 may determine an impact associated with the risk occurring to the electronic information resource 120. The impact may be, for example, a loss of data, a loss of availability, a loss of privacy, and so on.

Security risk analysis logic 140 facilitates automating risk assessment. The risk assessment can be based on the described risks, on known vulnerabilities, and on known counter measures and protections applied to a resource. If both a threat and a vulnerability exist at the same time for the same resource, then the risk analysis logic 140 may be able to raise an alarm concerning this situation. In dynamic situations, this automated risk analysis based on automated risk assessment may provide superior results over conventional manual systems.

System 100 also includes a recovery logic 150. Upon the occurrence of a risk (e.g., a denial of service attack, a hard drive crash, a power outage, a physical intrusion), the recovery logic 150 is to determine what recovery, if any, is attainable for the electronic information resource 120. In identifying what recovery, if any, is available for information resource 120, recovery logic 150 may establish a recovery time objective that describes when the electronic information resource 120 is likely to be available. There may be a confidence factor associated with this recovery time objective (e.g., 50% likely that resource will be available within 24 hours). This may facilitate planning business resumption and may facilitate informing users, clients, regulators, and so on about when a system will be back on line. Additionally, recovery logic 150 may establish a recovery point objective that describes a point in time to which the electronic information resource 120 is to be recovered. This describes the point in time after which data associated with the information resource may need to be recreated. This may facilitate scheduling personnel, processes, and/or processor time for recreating that data.

System 100 also includes a score logic 160 that is to determine values that quantify security management performance. The security management performance may be measured for individual electronic information resources and/or for sets of information resources. In one example, the score logic 160 is to produce values that quantify compliance with a standard, a current degree of risk, and/or a current loss expectancy. In one example, these values that quantify security management performance are produced automatically and are to be based on electronic data gathered automatically using database tools.

System 100 also includes a loss logic 170 that is to determine a loss expectancy associated with an electronic information resource and/or a set of information resources. In one example, the loss logic 170 is to determine a loss expectancy based on values including, but not limited to, an annualized basis exposure percentage, an annualized rate of occurrence, and a resource value. Thus, loss logic 170 may automatically provide information concerning how likely it is that a loss will occur and what the cost of that loss may be. Once again, this information may be produced automatically and based on electronic data gathered automatically using database tools.

Since loss logic 170 may compute a loss expectancy, asset data 110 may also include data describing an asset value associated with an electronic information resource, a loss likelihood associated with an electronic information resource, and a loss impact associated with an electronic information resource. This loss information may be used to determine values associated with addressing a risk. Thus, the asset data may also include data describing an insurability factor associated with an electronic information resource, a set aside amount associated with an electronic information resource, a cost associated with a single outage related to an electronic information resource, and an annual rate of occurrence associated with an electronic information resource. Additionally, the loss logic 170 may determine an aggregate single loss expectancy (SLE) for all the information assets exposed to sets of risks. This information may be used, for example, to determine whether additional countermeasures are justified.

System 100 also includes a decision logic 180 to provide a signal concerning an action to be taken. The action to be taken depends, at least in part, on a value(s) produced by the score logic 160 and/or the loss expectancy produced by the loss logic 170. In one example, the decision logic 180 is to provide a signal concerning a compliance determination, a budget allocation determination, a bonus determination, a compensation amount, an insurance premium, and a risk recovery set aside amount. The signal may be used to control, for example, a payroll application that determines a bonus for a security manager. The signal may be used to control, for example, whether an electronic compliance certificate is issued for a system as designed and/or deployed. This electronic compliance certificate may be, for example, an on-line real-time signal that is available to determine whether a system is in compliance with various guidelines and/or regulations.

Figure 2:
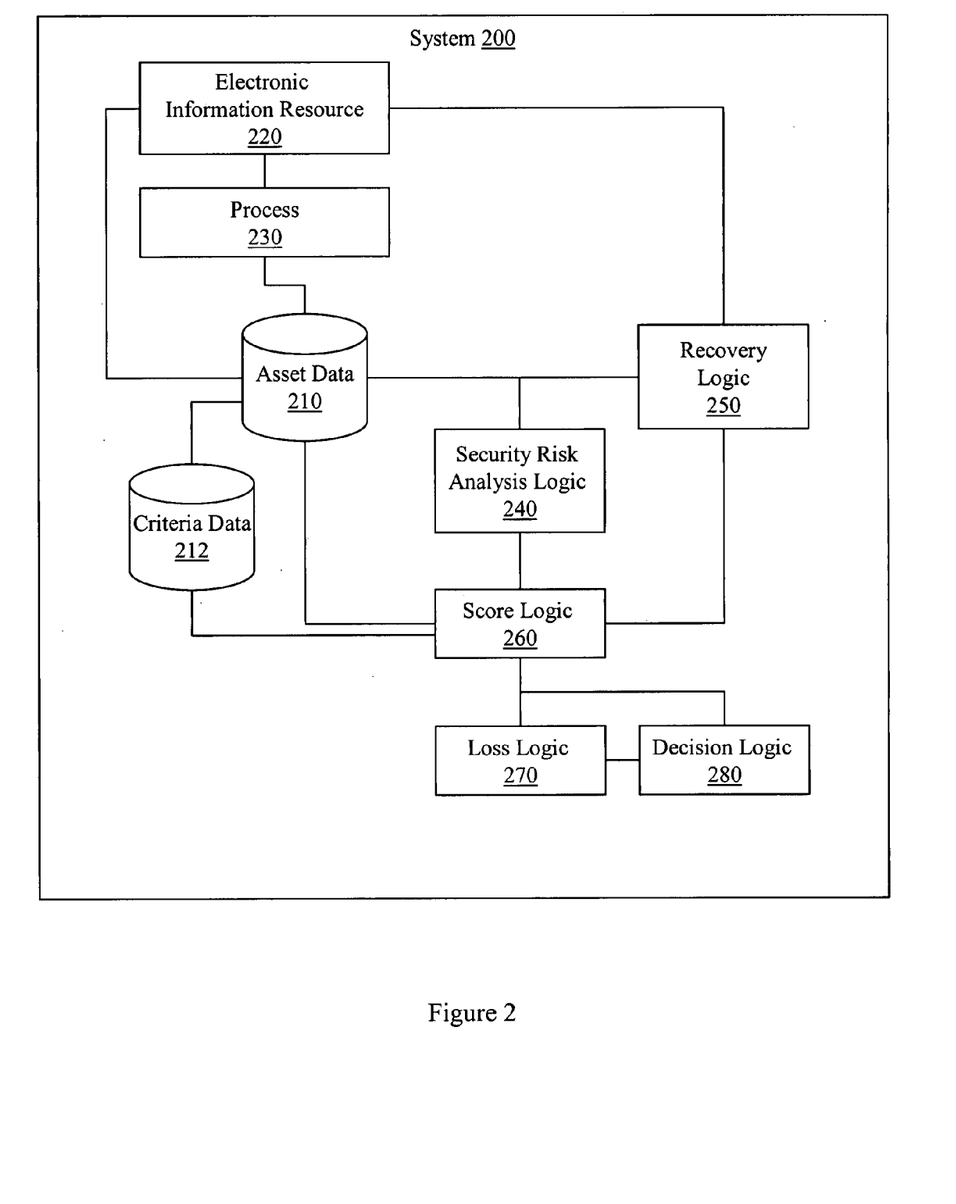
FIG. 2 illustrates a system associated with automated security management.

FIG. 2 illustrates a system 200 associated with automated security management. System 200 includes several elements similar to those described in connection with system 100 (FIG. 1). For example, system 200 includes a first data store 210 to store asset data concerning an electronic information resource 220 and a process 230. Similarly, system 200 includes a security risk analysis logic 240, a recovery logic 250, a score logic 260, a loss logic 270, and a decision logic 280. However, system 200 includes an additional data store 212 to store criteria data against which the asset data can be compared. Doing this comparison may facilitate computing a compliance score that describes how well security management is being performed for a set of electronic information resources.

The criteria data may include, for example, data associated with a standard, data associated with a regulation, and data associated with a procedure. These criteria data facilitate having a benchmark against which actual and/or planned security measures can be evaluated. As described above, criteria may come from private industry (e.g., VISA), from standards bodies (e.g., National Institute of Standards Technology (NIST)), from governments (e.g., state, federal), and so on. Thus, the standard may be an ISACA (Information Systems Audit and Control Association) standard, a NIST standard, an ISO standard, a NIACA (National Information Assurance Certification Accreditation) standard, and so on. Similarly, the regulation may be a SOX-related regulation, a GLB-related regulation, a HIPAA-related regulation, a Patriot Act related regulation, an SP 1386 (California) related regulation, and so on.

Score logic 260 may produce a compliance score based on comparing asset data to criteria data. The compliance score may also depend on recovery determinations produced by recovery logic 250 and/or on loss predictions produced by loss logic 270. The compliance score generated from the comparison of the asset data and criteria data may drive decision logic 280 to produce a signal that causes an action like providing a warning signal that a system has fallen out of compliance with a standard.

Decision logic 280 may address accreditation and certification. System 200 may use, for example, audit engagement capabilities in a database control manager for accreditation and certification activities. For example, project plans, audit objectives, and so on, may be taken from criteria data (e.g., NIST special publication 800-37) and used to analyze asset data and risk data. The certification and accreditation process can then proceed to analyze systems in the abstract (e.g., design) and/or in the concrete (e.g., deployed, implemented), with decision logic 280 providing a control signal related to an accreditation and/or certification level.

Figure 3:
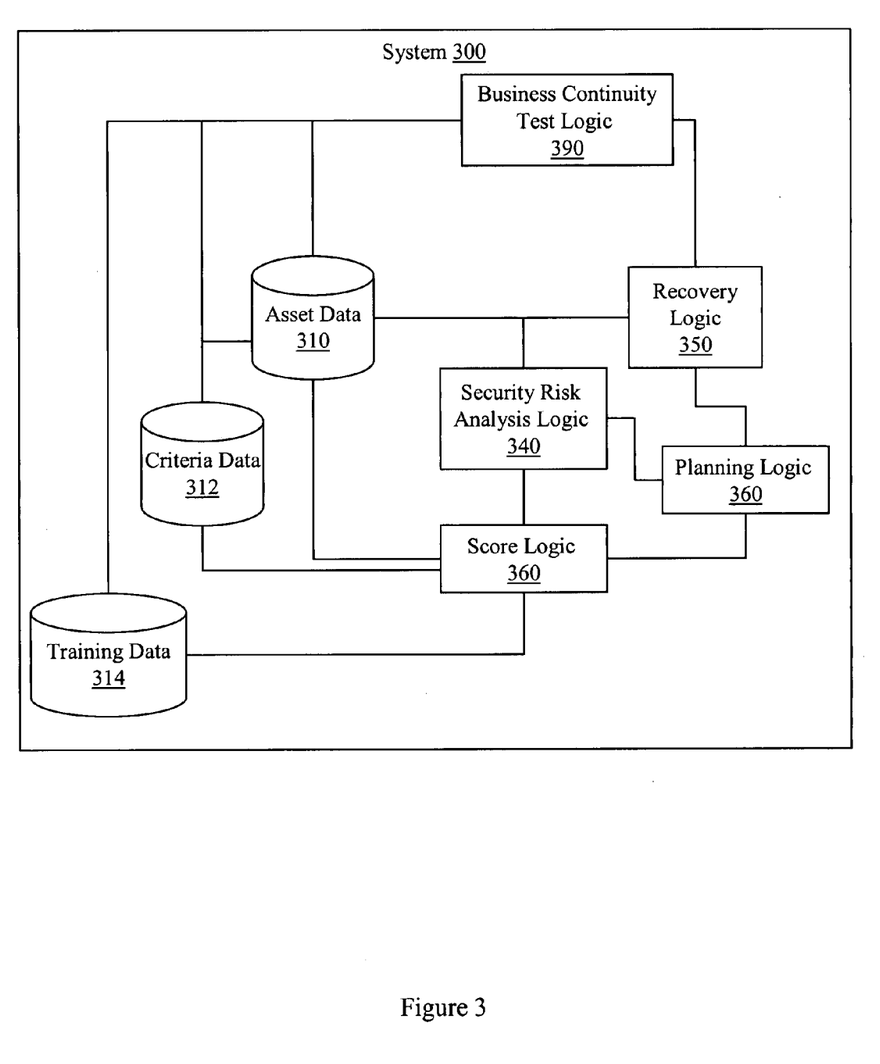
FIG. 3 illustrates a system associated with automated security management.

FIG. 3 illustrates a system 300 associated with automated security management. System 300 includes several elements similar to those described in connection with system 200 (FIG. 2). For example, system 300 includes a data store 310 to store asset data concerning an information resource and a process. Similarly, system 300 includes a data store 312 to store criteria data, a security risk analysis logic 340, a recovery logic 350, and a score logic 360. However, system 300 includes an additional data store 314 to store a set of training data. This training data may be related to the criteria data, the scores produced by the score logic 360, and so on. What training data is available may itself be considered in producing a compliance score. Similarly, determining how many users and which users of a computing system (e.g., database system) for which system 300 provides security management may be considered in producing a compliance score.

System 300 also includes a business continuity test logic 390 to schedule business continuity tests. These tests may include, for example, a non-computerized business continuity test, an automated business continuity test initiated with notice, and an automated business continuity test initiated without notice. In addition to scheduling a business continuity test, the business continuity test logic 390 may initiate a business continuity test, record results associated with the business continuity test result, and provide a score associated with the business continuity test to the score logic 360. What tests are planned and how the tests proceed may also contribute to a compliance score produced by score logic 360. Similarly, how regularly tests are planned and how well resources perform during the tests may be considered in a score related to compensation. For example, if an appropriate number and mixture of tests are scheduled and come off within a desired performance range, then a certification determination may be made for system 300 and a bonus determination may be made for a security manager of system 300.

A business continuity plan addresses questions surrounding the occurrence of a risk and/or the resulting loss of a resource. For example, if a certain resource is lost, what can still be done? What can not still be done? At what level can a certain process perform? A business continuity plan may include, for example, an incident response team definition. Response teams can be defined for incident types, resources, and so on. A business continuity plan may also include an incident response activity plan. This may list activities, assigned roles, dependencies, and so on, involved in responding to an incident. This may help insure information systems operate according to security objectives, even in the face of an incident (e.g., occurrence of a risk). Having a business continuity plan for certain resources may be a criteria against which a security management system is evaluated.

A business continuity plan may also include failover facilities information. The business continuity plan may record facilities upon which a process or system may rely if a primary facility becomes unavailable. Failover facilities may be specific (e.g., replacement server to run process) or may be multi-purpose (e.g., data storage can store different tables). A failover facility may be characterized by its independence from a threat present at a primary facility (e.g., different power grid, different physical location), by its ability to carry on an activity (e.g., battery life available), its capacity (e.g., megaflops per second, terabytes of storage), and so on.

System 300 may also include a planning logic 360 to plan automated responses to a risk. These responses may include identifying a response team to notify, identifying a call tree to be used to notify the team, initiating the notification, and so on. The responses may also include identifying a response process to initiate and a response protocol to be followed. The responses may include taking actions associated with accepting a risk, taking actions associated with mitigating a risk, and taking actions associated with transferring a risk. Accepting a risk may include notifying personnel that a risk exists and simply monitoring a developing situation. Accepting a risk may also include causing a dollar amount to be set aside in case the risk comes in to being. Mitigating a risk may include taking actions to reduce the likelihood the risk will occur and/or taking actions to reduce the impact if the risk occurs. Thus, in one example, the planning logic 360 may select a countermeasure to apply upon the occurrence of a risk. The countermeasure may include initiating failover processing (e.g., starting a backup server), restricting electronic access to a resource (e.g., raising firewall protection levels), restricting physical access to a resource (e.g., locking a door), and so on.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here and generally is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and so on.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Figure 4:
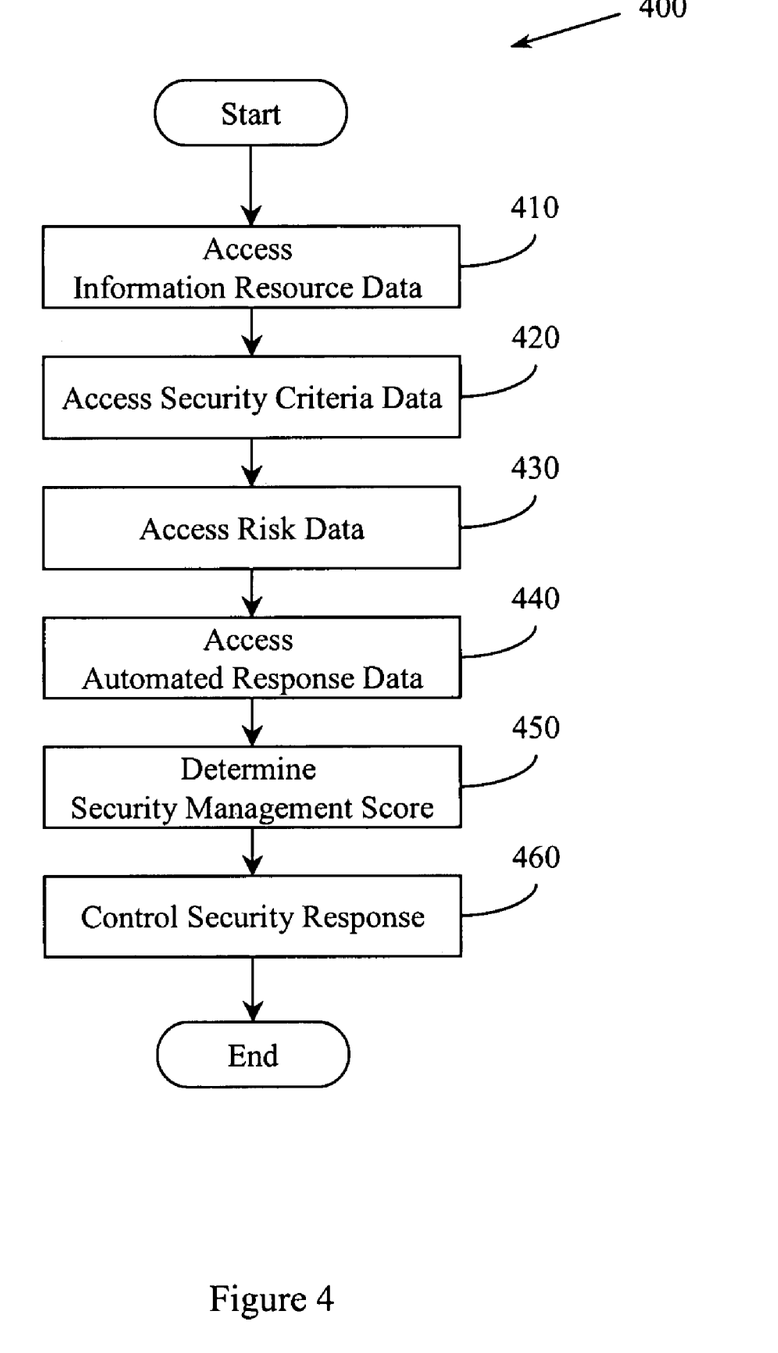
FIG. 4 illustrates a method associated with automated security management.

FIG. 4 illustrates a method 400 associated with automated security management. Method 400 may include, at 410, accessing a first set of data that concerns computer-supported information resources and processes that interact with (e.g., rely on) the computer-supported information resources. The first set of data may describe and/or characterize information resources and processes. Describing a resource may include identifying its name, location, owner, custodian, and so on. Characterizing a resource may include identifying its security classification, identifying risks to which it may be exposed, identifying countermeasures available to handle the risk, and so on. Describing a process may include identifying its name, location, size, priority, and so on. Characterizing a process may include identifying a resource(s) upon which it relies. In one example, the information resources are associated with a database system. For example, the information resources may be tables, rows, columns, and so on. In one example, the processes associated with the first data set are database processes. For example, the processes may be stored procedures, applications, executables, and so on.

Method 400 also includes, at 420, accessing a second set of data that concerns security criteria related to the computer-supported information resources. The security criteria data may describe security measures that are suggested and/or required for an information resource in order to make the resource have a desired security level and/or to make the protection associated with the information resource comply with a standard. The security criteria may describe physical and/or electronic protections to be applied to a resource, plans to be made to address risks to which a resource is exposed, failover processing requirements for a resource, and so on.

Method 400 also includes, at 430, accessing a third set of data that concerns risks to which computer-supported information resources may be exposed and for which protection is to be managed. The risks may be described in general terms (e.g., virus, power failure) and/or in specific terms (e.g., the xyz virus, a 100% blackout without warning). The risks may be current and/or potential. The likelihood of a risk occurring may be determined and, in one example, may be updated in a dynamic, on-going basis.

Method 400 also includes, at 440, accessing a fourth set of data that concerns automated responses available to apply upon determining that a computer-supported information resource has been subjected to a risk. The automated responses may include implementing physical and/or electronic actions. A physical action may include, for example, turning off the power to a device so that it will not melt down, locking a door so that an intruder cannot access a certain location, releasing a gas (e.g., argon) to put out a fire, and so on. An electronic action may include, for example, switching processing to a backup device, raising protection levels, causing a backup to occur, and so on.

Method 400 also includes, at 450, determining a security management score(s). The determination may be based, at least in part, on comparing existing situations to desired situations. For example, the third set of data may be analyzed in light of the fourth set of data. Similarly, the first set of data may be analyzed in light of the second, third, and/or fourth sets of data. The security management scores quantify items including, for example, the protection level of a designed system, the protection level of a deployed system, the degree to which a designed system complies with security criteria, the degree to which a deployed system complies with security criteria, and so on.

Method 400 also includes, at 460, controlling a security process based on a security management score(s). The security process may be concerned with determining whether a compliance certification is to be issued for a system in which the information resources described in the first set of data appear. Thus, the security process may produce a pass/fail rating for a system. This may facilitate automated auditing of a system. Additionally, and/or alternatively, the security process may be concerned with whether an automated response to a risk is to be initiated, whether a security measure associated with an information resource is to be altered, whether a potential loss associated with an information resource is to be insured against, and so on. This may facilitate automating the security management of a system.

Figure 5:
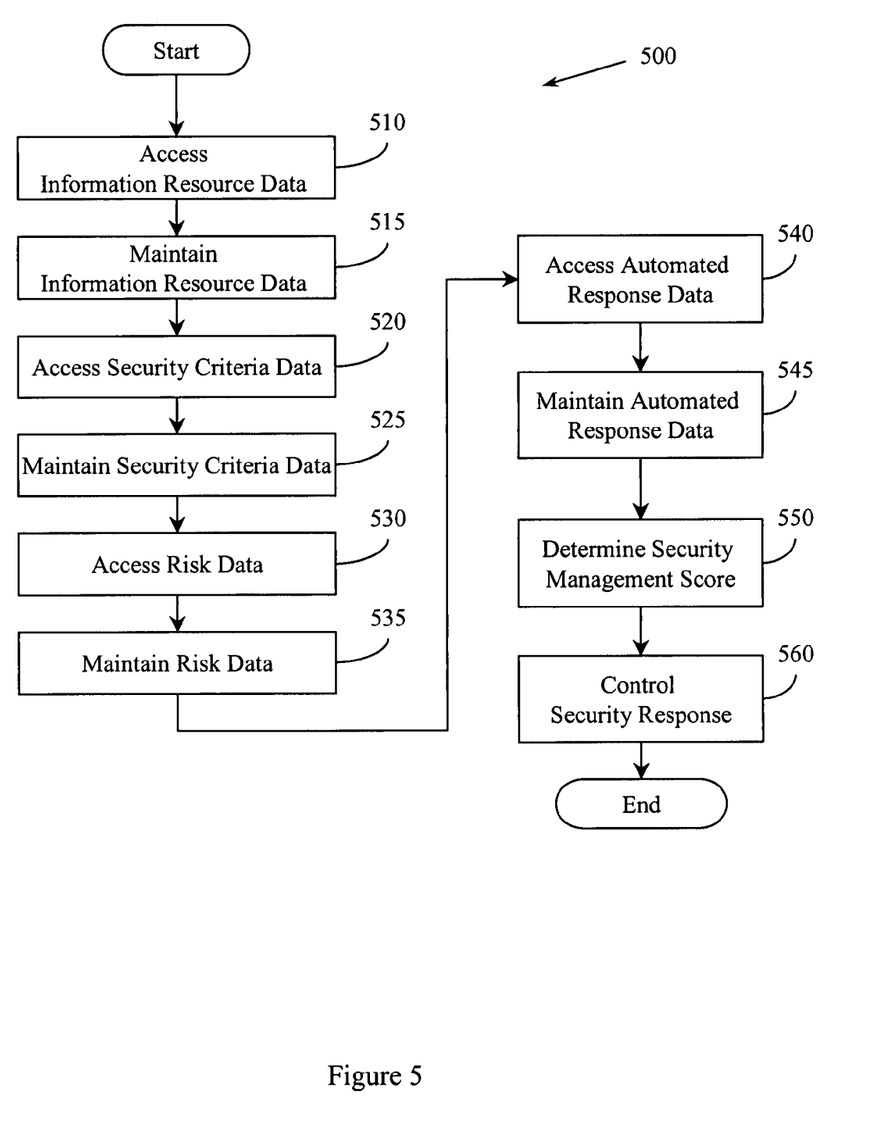
FIG. 5 illustrates a method associated with automated security management.

FIG. 5 illustrates a method 500 that includes several of the actions associated with method 400 (FIG. 4). For example, method 500 includes accessing 510 information resource data, accessing 520 security criteria data, accessing 530 risk data, accessing 540 automated response data, determining 550 a security management score, and controlling 560 a security response. However, method 500 includes additional actions.

For example, method 500 includes maintaining data sets. While maintaining 515 the information resource data, maintaining 525 the security criteria data, maintaining 535 the risk data, and maintaining 545 the automated response data are all illustrated in FIG. 5, it is to be appreciated that different embodiments of method 500 may include a subset of these actions. Maintaining a data set as claimed and described may include creating the data set, updating the data set, and so on. Creating the data set may include automatically acquiring information from an enterprise, automatically acquiring data from a database system, and so on. The data may be acquired using, for example, queries, crawlers, spiders, automated processes, and so on. Updating the data may include adding data, removing data, altering data, and so on. The updating may be based on data provided by automated processes, crawlers, and so on.

Figure 6:
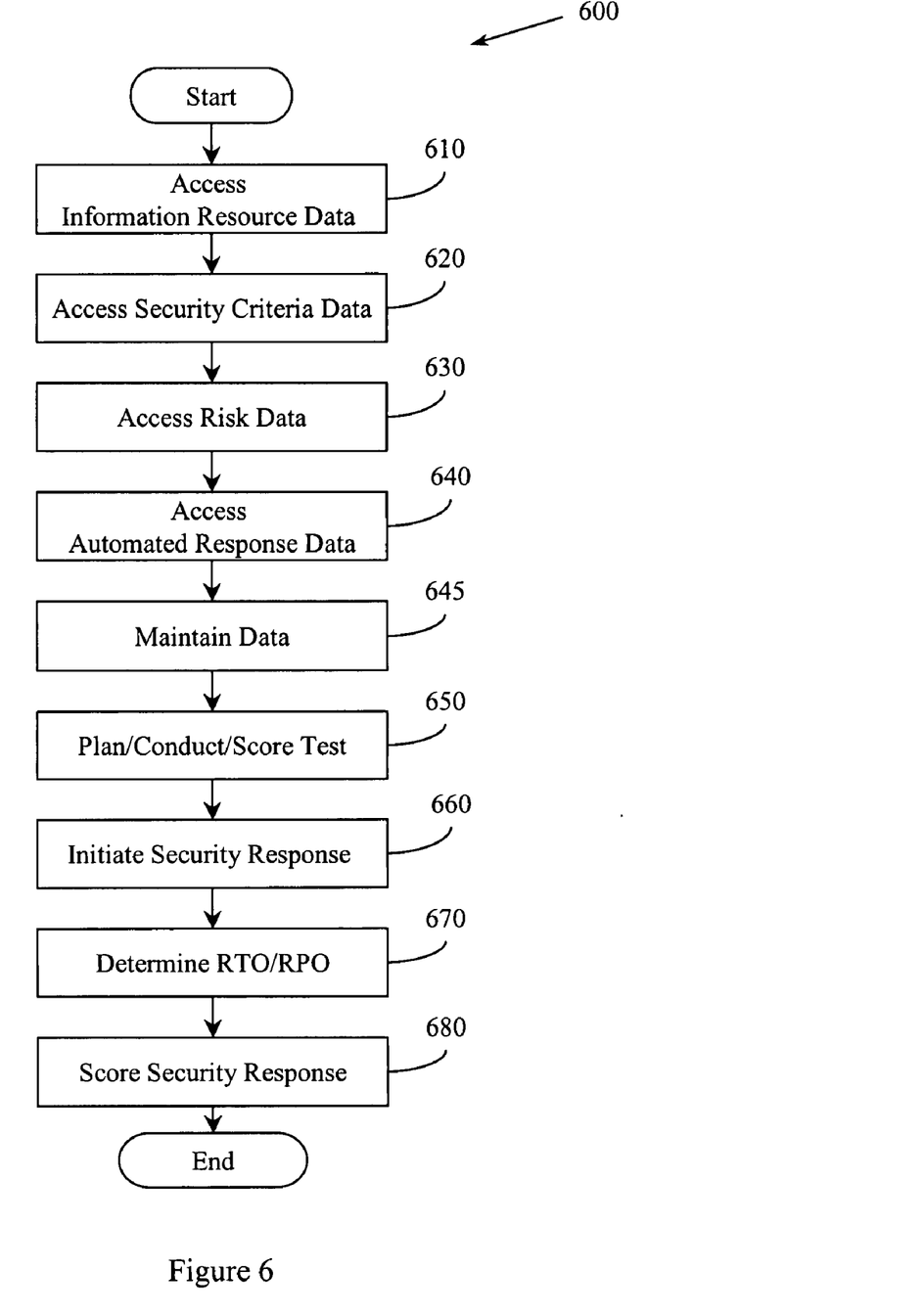
FIG. 6 illustrates a method associated with automated security management.

FIG. 6 illustrates a method 600 that includes several of the actions associated with method 400 (FIG. 4). For example, method 600 includes accessing 610 information resource data, accessing 620 security criteria data, accessing 630 risk data, and accessing 640 automated response data. However, method 600 includes additional actions.

For example, method 600 includes, at 645, maintaining data. As described in connection with method 500 (FIG. 5), maintaining data may include creating and updating data using automated processes.

Method 600 may also include, at 650, planning, conducting, and/or scoring a business continuity test. Planning a business continuity test may include, for example, planning a paper based test where no actual electronic or physical threats will be simulated. Planning a business continuity test may also include, for example, planning an actual test where actual electronic and/or physical threats may be simulated. In planning for this type of test, appropriate safeguards (e.g., failover processing, backup devices) may need to be brought online in certain orders and verified before the test is allowed to proceed. The number, type, and nature of business continuity tests may be one factor considered in computing a security metric.

Method 600 may also include, at 660, automatically initiating a security response. The security response may be described in the automated response data set. The security response may be initiated upon determining that a risk has materialized for an impacted information resource. The risk may have materialized naturally and/or may have materialized as part of a planned business continuity test. Thus, whether the response is initiated may depend, at least in part, on whether the risk is real or simulated. Whether a response is initiated may also depend, at least in part, on comparing the predicted loss due to the occurrence of the risk and the predicted cost of doing nothing.

Once a response has been determined and initiated, method 600 may proceed, at 670, to compute values that describe when, how, and/or if things will return to normal. This computing may include, for example, computing a recovery time objective for the impacted information resource. The recovery time objective may describe when, if ever, an information resource is expected to be available. The computing may also include, for example, computing a recovery point objective for the impacted information resource. The recovery point objective may describe a point in time to which the information resource will be returned. This may facilitate planning for recovering from the risk.

Method 600 may also include, at 680, scoring the result of the security response. The score may depend, for example, on the computed recovery time objective and the computed recovery point objective. A response that quickly brings a resource back online and that generates a return point objective that is very close to actual clock time may receive a first (e.g., high) score. A response that slowly brings a resource back online and that generates a return point objective that lags well behind actual clock time may receive a second (e.g., lower) score. The score may be used to determine, for example, whether a security response is adequate, whether a security configuration is adequate, and so on. The score may also be used to determine, for example, whether additional (e.g., remedial) actions need to be taken for a system. The score may also be used to determine, for example, a performance score for a security manager. This performance score may be used during a personnel review, for example.

Figure 7:
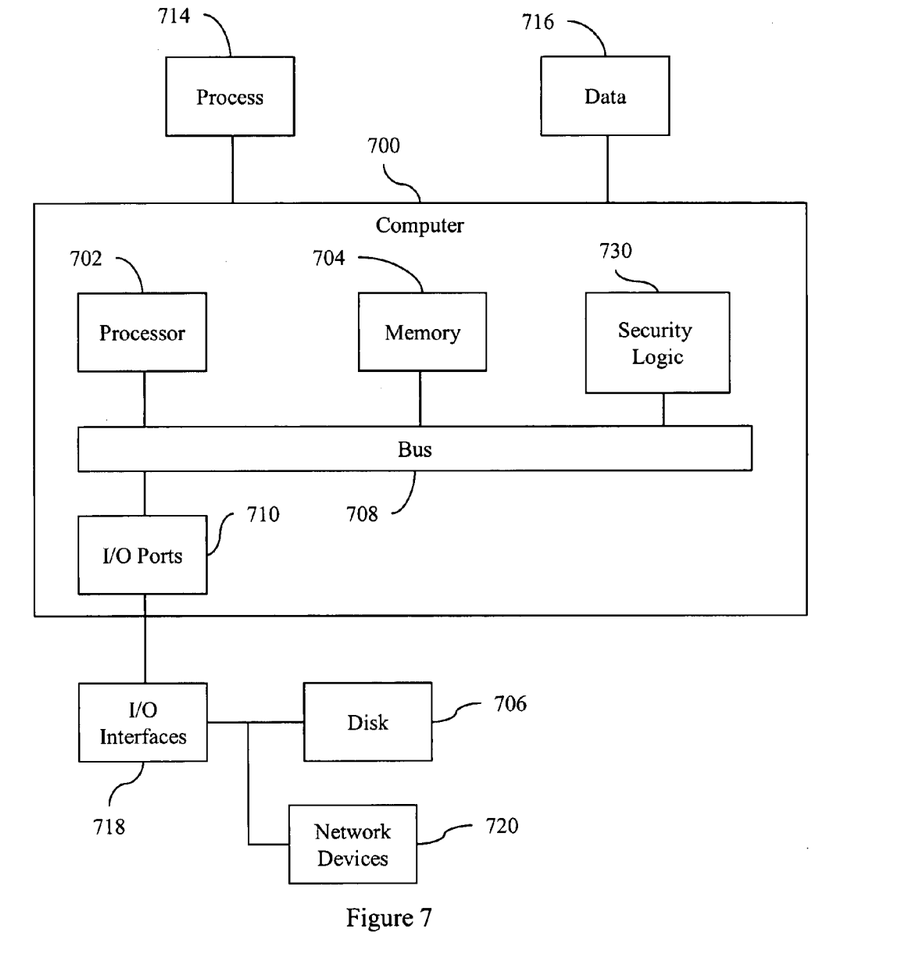
FIG. 7 illustrates an example computing environment in which example systems and methods illustrated herein can operate.

FIG. 7 illustrates an example computing device in which example systems and methods described herein, and equivalents, can operate. The example computing device may be a computer 700 that includes a processor 702, a memory 704, and input/output ports 710 operably connected by a bus 708. In one example, the computer 700 may include a security logic 730 configured to perform automated security management. Logic 730 may include means (e.g., hardware, executable instructions, firmware) for collecting, organizing, and maintaining data concerning electronic information resources. The means may include automated processes associated with database processing and/or enterprise processing. The data may identify, characterize and/or describe electronic information resources. Logic 730 may also include means (e.g., hardware, executable instructions, firmware) for collecting, organizing, and maintaining data concerning security criteria to which the electronic information resources are to be subjected. The security criteria may be described in standards, guidelines, regulations, and so on. The means may include automated processes associated with database processing and/or enterprise processing. Logic 730 may also include means (e.g., hardware, executable instructions, firmware) for collecting, organizing, and maintaining data concerning security risks to which the electronic information resources are susceptible. The data may identify generic risks (e.g., denial of service attack) and/or specific risks (e.g., current worm infection). The means may include automated processes associated with database processing and/or enterprise processing. Logic 730 may also include means (e.g., hardware, executable instructions, firmware) for making an automated security management decision. The decision may be based on comparing values in the different sets of data (e.g., data concerning the electronic information resources, data concerning security criteria, data concerning security risks).

Generally describing an example configuration of the computer 700, the processor 702 can be a variety of various processors including dual microprocessor and other multi-processor architectures. The memory 704 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. The disk 706 can include, but is not limited to, a magnetic disk drive, a solid state disk drive, a floppy disk drive, a tape drive, a Zip drive, a flash memory card, and/or a memory stick. Furthermore, the disk 706 can include optical drives including a CD-ROM, a CD recordable drive (CD-R drive), a CD rewriteable drive (CD-RW drive), and/or a digital video ROM drive (DVD ROM). The memory 704 can store processes 714 and/or data 716, for example. The disk 706 and/or memory 704 can store an operating system that controls and allocates resources of the computer 700.

The bus 708 can be a single internal bus interconnect architecture and/or other bus or mesh architectures. While a single bus is illustrated, it is to be appreciated that computer 700 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 700 may interact with input/output devices via i/o interfaces 718 and input/output ports 710. Input/output devices can include, but are not limited to, a keyboard, a microphone, a pointing and selection device, cameras, video cards, displays, disk 706, network devices 720, and so on. The input/output ports 710 can include but are not limited to, serial ports, parallel ports, and USB ports.

The computer 700 can operate in a network environment and thus may be connected to network devices 720 via the i/o interfaces 718, and/or the i/o ports 710. Through the network devices 720, the computer 700 may interact with a network. Through the network, the computer 700 may be logically connected to remote computers. The networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 720 can connect to WAN technologies including, but not limited to, point to point links, circuit switching networks (e.g., integrated services digital networks (ISDN)), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   a first data store to store asset data that is related to an electronic information resource and that is related to a process that relies on the electronic information resource;
   a security risk analysis logic to identify a risk associated with the electronic information resource and to determine an impact associated with the risk occurring to the electronic information resource;
   a recovery logic to determine an attainable recovery for the electronic information resource after the risk occurs, where the attainable recovery includes a recovery point objective associated with a version of the electronic information resource that is to be recreated from before the risk occurring;
   wherein the recovery logic is configured to establish a recovery time objective that describes a first point in time when the electronic information resource is to be available after the risk occurs, and where the time objective includes a confidence factor that describes the likelihood of attaining recovery by the recovery time objective;
   a score logic to determine one or more values that quantify security management performance with respect to a set of electronic information resources that include the electronic information resource, where the score logic is configured to score the automated security action based at least in part on the confidence factor and achieving the recovery point objective within the recovery time objective when the automated security action occurs;
   a loss logic to determine a loss expectancy associated with the electronic information resource, the loss expectancy being determined from the one or more values; and
   a decision logic to provide a signal concerning an automated security action to be taken, where the action to be taken depends, at least in part, on the values, or the loss expectancy, wherein the recovery logic, the score logic, the loss logic, and the decision logic are embodied on a non-transitory computer readable medium.

2. The system of claim 1, including a second data store to store criteria data against which the asset data can be compared to determine a compliance score related to security management of the set of electronic information resources.

3. The system of claim 2, the criteria data including data associated with a standard, data associated with a regulation, or data associated with a procedure, the standard being an ISACA standard, a NIST standard, an ISO standard, or a NIACA standard, the regulation being a SOX-related regulation, a GLB-related regulation, a HIPAA-related regulation, a Patriot Act related regulation, or an SP 1386 (California) related regulation.

4. The system of claim 1, the asset data including data that describes a process or an electronic information resource upon which the process relies, electronic information resource ownership, electronic information resource custody, an electronic information resource security classification, a maximum allowable downtime associated with an electronic information resource, a failover resource associated with an electronic information resource, or an asset value associated with an electronic information resource.

5. The system of claim 4, the asset data including data that describes a disaster recovery plan associated with an electronic information resource, a risk countermeasure available for an electronic information resource, a threat response plan associated with an electronic information resource, a business continuity plan associated with an electronic information resource, a purge schedule associated with an electronic information resource, a physical access limitation associated with an electronic information resource, an electronic access limitation associated with an electronic information resource, a loss likelihood associated with an electronic information resource, a loss impact associated with an electronic information resource, an insurability factor associated with an electronic information resource, a set aside amount associated with an electronic information resource, a cost associated with a single outage related to an electronic information resource, or an annual rate of occurrence associated with an electronic information resource.

6. The system of claim 1, where the asset data describes electronic information resources associated with a database system and where the processes that rely on the electronic information resources are database processes.

7. The system of claim 1, where the security risk analysis logic is configured to identify a confidentiality risk, an availability risk, an integrity risk, an authentication risk, or a non-repudiation risk.

8. The system of claim 1, including a third data store to store a set of training data related to the criteria data or the values produced by the score logic.

9. The system of claim 1, including a business continuity test logic configured to schedule a non-computerized business continuity test, an automated business continuity test with notice, or an automated business continuity test without notice, the business continuity test logic to initiate a business continuity test, to record a business continuity test result, and to provide a score associated with the business continuity test to the score logic.

10. The system of claim 9, including a planning logic configured to plan an automated response to the risk.

11. The system of claim 10, where the planning logic is configured to perform the automated response including identifying a response team, a call tree, a response process to initiate, or a response protocol to be followed.

12. The system of claim 10, the automated response being one of, accepting a risk, mitigating a risk, and transferring a risk.

13. The system of claim 10, where the planning logic is configured to select a countermeasure to apply upon the occurrence of the risk.

14. The system of claim 1, where the score logic is configured to produce values that quantify compliance with a standard, a current degree of risk, or a current loss expectancy, and where the score logic scores the automated security action dynamically as it occurs.

15. The system of claim 1, where the loss logic is to determine a loss expectancy based on an annualized basis exposure percentage, an annualized rate of occurrence, and a resource value.

16. The system of claim 1, where the decision logic is to provide a signal concerning a compliance determination, a budget allocation determination, a bonus determination, a compensation amount, an insurance premium, or a risk recovery set aside amount.

17. A non-transitory machine-readable medium having stored thereon machine-executable instructions that if executed by a machine cause the machine to perform a method, the method comprising:
  accessing a first set of data concerning one or more computer-supported information resources and one or more processes that rely on the computer-supported information resources;
  accessing a second set of data concerning one or more security criteria related to the one or more computer-supported information resources;
  accessing a third set of data concerning one or more risks associated with the one or more computer-supported information resources;
  accessing a fourth set of data concerning one or more automated responses available to apply upon determining that a computer-supported information resource of the one or more computer-supported information resources has encountered a risk of the one or more risks;
  automatically initiating a response from the fourth data set on determining that a risk has occurred for an impacted information resource of the one or more computer-supported information resources; and
  scoring the response based, at least in part, on a recovery time objective, and a recovery point objective associated with the response when the response occurs, where the recovery point objective is a version of the impacted information resource that is to be recreated, where the recovery time objective is a first point in time when the impacted electronic information resource is to be available after the risk occurs, and where the time objective includes a confidence factor that describes the likelihood of attaining recovery by the first point in time.

18. The machine-readable medium of claim 17, where the method includes maintaining the first set of data, the second set of data, the third set of data, or the fourth set of data.

19. The machine-readable medium of claim 17, where the method includes planning a business continuity test, conducting a business continuity test, or scoring the result of a business continuity test.

20. The machine-readable medium of claim 17, controlling a security process based on the one or more security criteria that are based, at least in part, on analyzing the first set of data in light of the second, third, and fourth sets of data, or analyzing the third set of data in light of the fourth set of data, where the security process determines whether a compliance certification is to be issued for a system in which one or more of the information resources appear, whether an automated response to a risk is to be initiated, whether a security measure associated with an information resource is to be altered, whether a potential loss associated with an information resource is to be insured against, or a compensation determination for security management personnel.

21. The machine-readable medium of claim 17, where the information resources associated with the first data set are associated with a database system and where the processes associated with the first data set are database processes.

22. A non-transitory machine-readable medium having stored thereon machine-executable instructions that when executed by a machine cause the machine to perform a method, the method comprising:

collecting, organizing, and maintaining data concerning security criteria to which electronic information resources are to be subjected; collecting, organizing, and maintaining data concerning security risks to which the electronic information resources are susceptible;

generating an automated security management decision based on analysis of data concerning the electronic information resources, the data concerning the security criteria, and the data concerning the security risks, where making an automated security management decision includes making a decision concerning an attainable recovery for one or more of the electronic information resources after one or more of the security risks occurs, where the attainable recovery includes a recovery point objective that indicates a version of the electronic information resource from a set of versions that is to be recreated, a recovery time objective that indicates a first point in time when the electronic information resource is to be available after a risk occurs, and a confidence factor that describes the likelihood of attaining the recovery point objective by the first point in time; and scoring an automatic response to the security risk when the security risk occurs based, at least in part, on the recovery point objective, the recovery time objective, and the confidence factor.

* * * * *

UNITED STATES PATENT AND TRADEMARK OFFICE
CERTIFICATE OF CORRECTION

| | | |
|---|---|---|
| PATENT NO. | : 8,166,551 B2 | Page 1 of 1 |
| APPLICATION NO. | : 11/879429 | |
| DATED | : April 24, 2012 | |
| INVENTOR(S) | : Nigel King | |

It is certified that error appears in the above-identified patent and that said Letters Patent is hereby corrected as shown below:

In column 1, line 15, delete "Blilely" and insert -- Bliley --, therefor.

In column 2, line 42, delete "protocols)," and insert -- protocols)), --, therefor.

In column 4, line 63, delete "a logic, software," and insert -- a logic software, --, therefor.

In column 5, line 13, delete "servelet," and insert -- servlet, --, therefor.

Signed and Sealed this
Seventh Day of August, 2012

David J. Kappos
*Director of the United States Patent and Trademark Office*